United States Patent [19]

Awadalla

[11] 4,340,785

[45] Jul. 20, 1982

[54] RINGING SIGNAL SUPPLY

[75] Inventor: Makary M. Awadalla, Ottawa, Canada

[73] Assignee: Northern Telecom Limited, Montreal, Canada

[21] Appl. No.: 228,095

[22] Filed: Jan. 26, 1981

[51] Int. Cl.³ ............................................. H04M 5/12
[52] U.S. Cl. .............................. 179/51 AA; 179/84 R; 363/74; 363/97
[58] Field of Search .............. 179/84 R, 84 A, 18 HB, 179/51 AA, 17 E, 2.51; 363/40, 41, 78, 74, 63, 124, 98

[56] References Cited

U.S. PATENT DOCUMENTS

| | | | |
|---|---|---|---|
| 3,205,424 | 9/1965 | Bates | 363/40 |
| 3,402,342 | 9/1968 | Wagner | 323/18 |
| 3,564,394 | 2/1971 | Opal et al. | 363/74 |
| 3,970,916 | 7/1976 | Kienscherf | 363/41 |
| 4,056,693 | 11/1977 | Bosik et al. | 179/84 R |
| 4,220,826 | 9/1980 | Kiss | 179/51 AA |
| 4,244,015 | 1/1981 | Beebe | 363/41 |
| 4,244,016 | 1/1981 | Mitchell | 363/98 |
| 4,264,786 | 4/1981 | Yoshino et al. | 179/51 AA |
| 4,270,028 | 5/1981 | Young | 179/84 R |
| 4,282,410 | 8/1981 | Gauthier et al. | 179/51 AA |

Primary Examiner—Gerald L. Brigance
Attorney, Agent, or Firm—R. John Haley

[57] ABSTRACT

A ringing signal supply, provided at a concentrator remote from a switching office, compares a fraction of its output with a low level reference ringing signal supplied from the switching office to product an error signal. The error signal, if it exceeds a positive or negative threshold, is gated during respective half-cycles of a rectangular alternating voltage produced by an inverter to control a bidirectional switch to connect the inverter output to the input of a low pass filter, whose output constitutes the output ringing signal. In this manner the instantaneous voltage of the output ringing signal is modified to reduce the error signal, whereby the output ringing signal has the same frequency and waveform as the reference ringing signal. The inverter can produce the alternating voltage commonly for a plurality of ringing signal supplies.

9 Claims, 3 Drawing Figures

RINGING SIGNAL SUPPLY

This invention relates to ringing signal supplies, for producing ringing signals for supply to telephone subscribers.

Ringing signal generators are provided in telephone exchanges or switching offices for generating the high level signals which are required for ringing subscribers' telephones. Typically the high level ringing signal is an 85 V RMS sinusoid, at a frequency of from 16 Hz to 67 Hz in the case of multi-frequency ringing. Where a group of subscribers is served by a concentrator which is remote from the switching office, the required high level ringing signals must be locally generated because high level ringing signals can not simply be supplied from the switching office via the concentrator to the subscribers' telephones. Especially in the case of multi-frequency ringing, however, it is still desirable for the switching office to supply to the concentrator a signal at the desired ringing frequency, in order to inform the concentrator of the ringing frequency which is to be supplied to a subscriber line. Such a reference ringing signal, being at a relatively low level, can be readily handled by the concentrator.

Accordingly, an object of this invention is to provide a ringing signal supply for producing a relatively high level ringing signal from a relatively low level reference ringing signal.

According to this invention there is provided a ringing signal supply comprising: switching means; a low pass filter; means for producing an error signal dependent upon differences between a representation of a signal at the output of the low pass filter and a reference ringing signal; and means responsive to the error signal for controlling the switching means to selectively connect a source of alternating voltage to the input of the low pass filter during alternate half-cycles of the alternating voltage to change the signal at the output of the low pass filter and thereby reduce said error signal, whereby the signal at the output of the low pass filter is an output ringing signal corresponding to said reference ringing signal.

Preferably the means for controlling the switching means comprises comparison means for comparing the error signal with first and second threshold levels to produce a first or a second control signal when the output ringing signal is to be made more positive or more negative respectively, and gating means for gating said first and second control signals during respective half-cycles of the alternating voltage to control said switching means.

The ringing signal supply conveniently includes a source of two oppositely-phased clock signals and an inverter which is responsive to said two clock signals to produce a substantially rectangular waveform alternating voltage, said inverter constituting said source of alternating voltage and said gating means serving to gate the first and second control signals each with a respective one of the two clock signals. The clock signals can have an arbitrary frequency (much higher than the ringing frequency) as far as the ringing signal supply itself is concerned, but for noise immunity considerations the clock signals are conveniently derived from the concentrator clock, which for example has a frequency of 24 kHz.

The invention also extends to a ringing signal supply arrangement comprising a plurality of ringing signal supplies, each as recited above, and an inverter for producing a substantially rectangular waveform alternating voltage, said inverter constituting said source of alternating voltage for all of the ringing signal supplies. The inverter can be responsive to the clock signals produced by a source of two oppositely-phased clock signals as already recited, which clock signals can be supplied commonly to the gating means of all the ringing signal supplies. To conserve power, the inverter can be prevented from operating, either by control via the clock signals or by interrupting the d.c. supply to the inverter, when none of the ringing signal supplies for which it supplies the alternating voltage is required to produce a ringing signal.

The invention will be further understood from the following description with reference to the accompanying drawings, in which.

Figure 1:
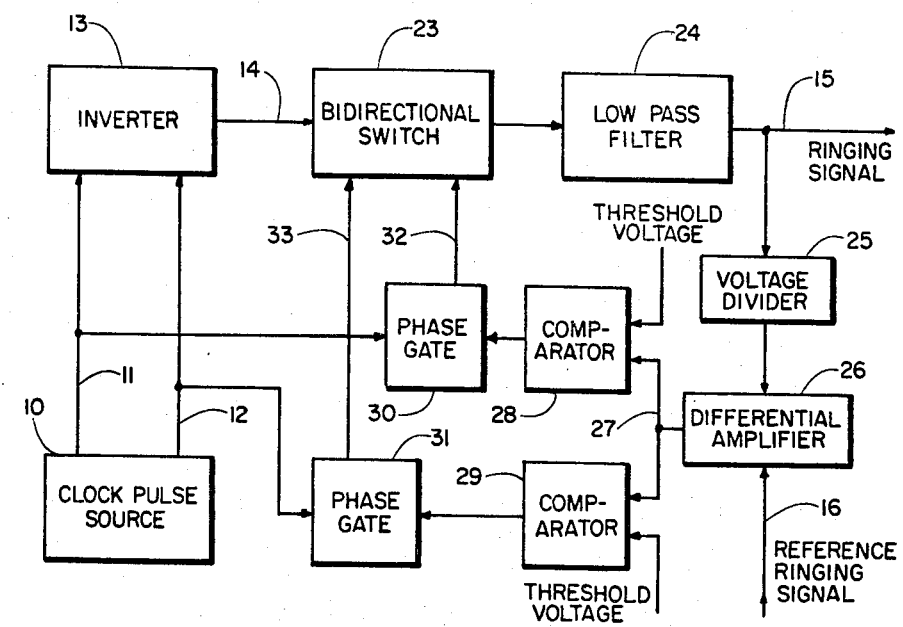
FIG. 1 illustrates in a block diagram a ringing signal supply according to the invention.
Figure 2:
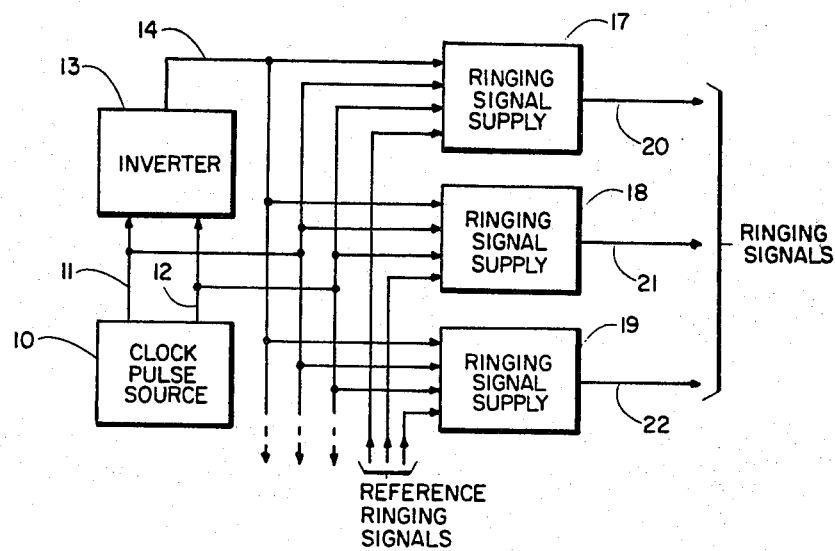
FIG. 2 illustrates an arrangement comprising a plurality of ringing signal supplies.

Referring to FIGS. 1 and 2, a clock pulse source 10 produces oppositely-phased clock signals on lines 11 and 12 which control an inverter 13 to produce a substantially rectangular wave alternating voltage, at the frequency of the clock signals, on a line 14. The remainder of FIG. 1 illustrates the components of a ringing signal supply which produces, from the alternating voltage on the line 14 and under the control of the clock signals on the lines 11 and 12, an output ringing signal on a line 15 whose frequency and waveform is determined by a low-level reference ringing signal supplied via a line 16. As shown in FIG. 2, a plurality of ringing signal supplies 17, 18, 19,—can be commonly controlled and powered via the lines 11, 12, and 14 to produce respective output ringing signals on lines 20, 21, 22,—in dependence upon respective reference ringing signals supplied thereto. For example, the low-level reference ringing signals are supplied from a switching office, via a remote concentrator at which the ringing signal supply arrangement is provided, for controlling the production of multi-frequency ringing signals at frequencies of from 16 Hz to 67 Hz for supply to individual subscriber stations which are served by the concentrator. The output ringing signals are typically sinusoidal signals, at frequencies which may be the same or different for different subscriber stations, at a relatively high level of 85 V to 100 V RMS. The ringing signal supplies 17, 18, 19, . . . all have the same form, as described below, regardless of the particular ringing frequency which is to be produced, because they do not determine the ringing frequency themselves.

Each ringing signal supply, as shown in FIG. 1, comprises a bidirectional switch 23 which is connected between the line 14 and the input of a low pass filter 24, whose output constitutes the output ringing signal. A fraction of the output ringing signal is produced by a voltage divider 25 and is subtracted from the reference ringing signal by a differential amplifier 26 to produce an error signal on a line 27. The error signal is compared with positive and negative threshold voltages in comparators 28 and 29, whose output signals are gated with the clock signals on the lines 11 and 12 in phase gates 30 and 31 respectively to produce control signals for the bidirectional switch 23 on lines 32 and 33. The arrangement is such that if, for example, the output ringing signal is too positive by a sufficient amount that the negative error signal consequently produced on the line 27 exceeds the negative threshold supplied to the comparator 29, then the comparator 29 produces a signal which is gated by the phase gate 31 to cause the switch 23 to connect the line 14 to the input of the low pass filter during half-cycles when the alternating voltage on the line 14 is negative, thereby making the output ringing signal more negative and reducing the magnitude of the error signal. Conversely, if the output ringing signal is too negative by a sufficient amount then, via the comparator 28 and phase gate 30, the switch 23 is controlled to connect the line 14 to the input of the low pass filter 24 during half-cycles when the alternating voltage on the line 14 is positive. In this manner, the output ringing signal is produced on the line 15 with the same frequency and waveform as the reference ringing signal on the line 16. The threshold voltages supplied to the comparators 28 and 29 serve to produce a desired hysteresis in the control of the bidirectional switch 23.

Figure 3:
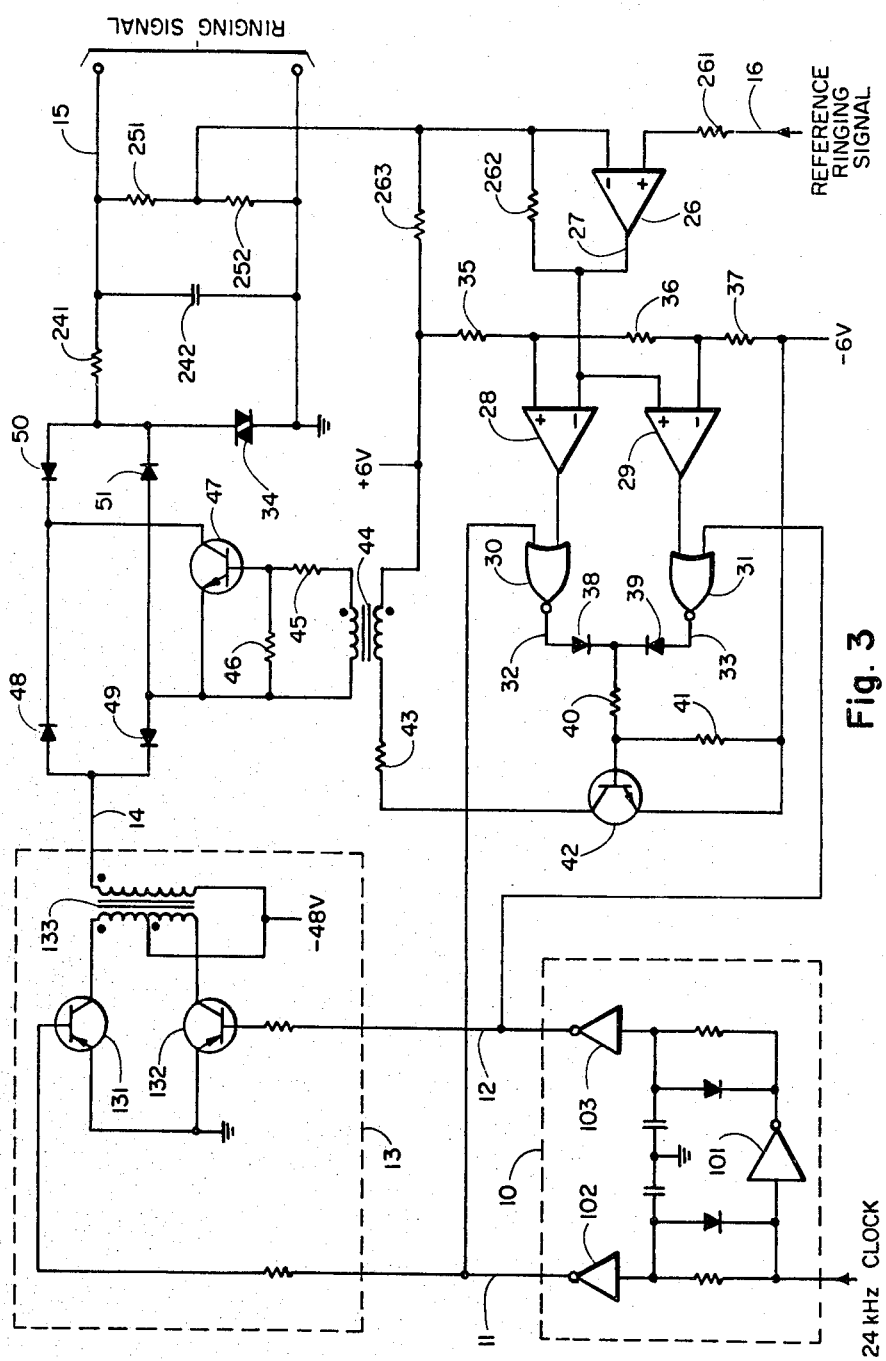
FIG. 3 illustrates in detail the ringing signal supply of FIG. 1.

FIG. 3 illustrates the ringing signal supply, inverter, and clock pulse source of FIG. 1 in greater detail, the same references being used to denote similar components.

As illustrated, the inverter 13 comprises two switching transistors 131 and 132 which control the application of a −48 V supply to the center-tapped primary winding of a transformer 133. The transistors 131 and 132 conduct alternately under the control of the clock signals on the lines 11 and 12, which signals are derived from a 24 kHz clock supplied by the concentrator to the clock pulse source 10. The source 10 includes an inverter 101, inverting buffers 102 and 103, and two delay circuits each comprising a series resistor, in parallel with a diode, and a shunt capacitor. The delay circuits are provided to prevent simultaneous conduction of the switching transistors 131 and 132. The secondary winding of the transformer is connected between the −48 V supply and the line 14, and produces a substantially rectangular waveform 400 V peak-to-peak alternating voltage, with a −48 V d.c. component, on the line 14. The −48 V d.c. component, which is provided in the output ringing signal as described below to facilitate a ring trip function, is provided at this point in the circuit to reduce the output voltage swing required of the transformer 133.

The low pass filter 24 is constituted by a series resistor 241 and a shunt capacitor 242. A surge voltage protector 34 is connected to the input of the filter 24 to provide protection against high voltages which may be induced on a telephone subscriber line connected to the output line 15. The voltage divider 25 is constituted by resistors 251 and 252 whose junction is connected to the inverting input of the differential amplifier 26. The reference ringing signal is supplied via a resistor 261 to the non-inverting input of this amplifier, which has a feedback resistor 262 connected between its output line 27 and its inverting input. A resistor 263 connected between a +6 V supply and the inverting input of the amplifier 26 provides a d.c. bias which produces the −48 V d.c. component of the output ringing signal.

A potential divider chain comprising series resistors 35, 36, and 37 produces the threshold voltages of +0.7 V and −0.7 V which are applied respectively to the non-inverting input of the comparator 28 and to the inverting input of the comparator 29, the line 27 being connected to the other inputs of these comparators. The phase gates 30 and 31 comprise NOR gates to the inputs of which the clock signals on the lines 11 and 12 and the outputs of the comparators 28 and 29 are respectively connected. The outputs of the gates 30 and 31 on the lines 32 and 33 are combined in an OR gate which is constituted by diodes 38 and 39, resistors 40 and 41, and a transistor 42. The collector of the transistor 42 is coupled via a resistor 43, an isolating transformer 44, and a potential divider comprising resistors 45 and 46 to the base of a switching transistor 47, whose collector-emitter path is connected across the diagonal of a diode bridge, comprising diodes 48 to 51 connected between the line 14 and the input of the low pass filter 24, to constitute the bidirectional switch 23.

It can be seen, therefore, that the instantaneous voltage of the output ringing signal on the line 15 is made more positive or negative, to conform the frequency and waveform of the output ringing signal of those of the reference ringing signal on the line 16, respectively by conduction via the diodes 48 and 51 and via the transistor 47 rendered conductive by the comparator 28 and gate 30 during half-cycles when the clock signal on the line 11 is low and the voltage on the line 14 is positive, or by conduction via the diodes 49 and 50 and via the transistor 47 rendered conductive by the comparator 29 and gate 31 during half-cycles when the clock signal on the line 12 is low and the voltage on the line 14 is negative. If the output ringing signal voltage and the reference ringing signal voltage are such that the error signal magnitude on the line 27 is less than 0.7 V, the transistor 47 is non-conductive.

Whilst a particular embodiment of the invention has been described in detail, it should be appreciated that numerous modifications, adaptations, and variations may be made without departing from the scope of the invention as defined by the claims. For example, and not by way of limitation, the clock signals supplied to the phase gates could be derived directly from the inverter 13, e.g. from a secondary of the inverter transformer. A different control logic arrangement can be provided, and this can be differently coupled to the bidirectional switch, for example via an opto-coupler. Furthermore, a different form of bidirectional switch, for example comprising a triac or comprising two separately controlled unidirectional current conducting switches for the two half-cycles, may be provided. In addition, the ringing signal supply could be provided at a central office instead of at a concentrator as described above, in which case the reference signal supplied to the ringing signal supply, for example, can be generated by an analog oscillator or can be read digitally from a store.

What is claimed is:

1. A ringing signal supply comprising:
    switching means;
    a low pass filter;
    means for producing an error signal dependent upon differences between a representation of a signal at the output of the low pass filter and a reference ringing signal; and
    means responsive to the error signal for controlling the switching means to selectively connect a source of alternating voltage to the input of the low pass filter during alternate half-cycles of the alternating voltage to change the signal at the output of the low pass filter and thereby reduce said error signal, whereby the signal at the output of the low pass filter is an output ringing signal corresponding to said reference ringing signal.

2. A ringing signal supply as claimed in claim 1 wherein the means for producing the error signal comprises a voltage divider coupled to the output of the low pass filter for producing a fraction of said output ringing signal and a differential amplifier to inputs of which said fraction of the output ringing signal and said reference ringing signal are applied and which produces the error signal at its output.

3. A ringing signal supply as claimed in claim 2 and including means for applying a d.c. bias to an input of said differential amplifier to produce a d.c. component in said output ringing signal.

4. A ringing signal supply as claimed in claim 1 wherein the means for controlling the switching means comprises comparison means for comparing the error signal with first and second threshold levels to produce a first or a second control signal when the output ringing signal is to be made more positive or more negative respectively, and gating means for gating said first and second control signals during respective half-cycles of the alternating voltage to control said switching means.

5. A ringing signal supply as claimed in claim 1, 2, or 4 and including an inverter for producing a substantially rectangular waveform alternating voltage, said inverter constituting said source of alternating voltage.

6. A ringing signal supply as claimed in claim 4 and including a source of two oppositely-phased clock signals and an inverter which is responsive to said two clock signals to produce a substantially rectangular waveform alternating voltage, said inverter constituting said source of alternating voltage and said gating means serving to gate the first and second control signals each with a respective one of the two clock signals.

7. A ringing signal supply as claimed in claim 6 wherein said inverter is arranged to produce said alternating voltage with a predetermined d.c. component, and including means for applying a d.c. bias to an input of the means for producing the error signal to produce said d.c. component in the output ringing signal.

8. A ringing signal supply arrangement comprising a plurality of ringing signal supplies each as claimed in claim 1, 2, or 3 for producing individual ringing signals at respective outputs, and an inverter for producing a substantially rectangular waveform alternating voltage, said inverter constituting said source of alternating voltage for all of the ringing signal supplies.

9. A ringing signal supply arrangement comprising a plurality of ringing signal supplies each as claimed in claim 4, a source of two oppositely-phased clock signals, and an inverter which is responsive to said two clock signals to produce a substantially rectangular waveform alternating voltage, said inverter constituting said source of alternating voltage for all of the ringing signal supplies and said two clock signals being supplied to the gating means of each ringing signal supply and being gated with the first and second control signals to control the switching means of the respective ringing signal supply.

* * * * *